United States Patent [19]

Weber

[11] Patent Number: 4,864,808
[45] Date of Patent: Sep. 12, 1989

[54] LEAF AND GRASS MULCHING ATTACHMENT FOR LAWN MOWERS

[76] Inventor: John H. Weber, Box 89, R.R. 1, Anchor, Ill. 61720

[21] Appl. No.: 302,674

[22] Filed: Jan. 27, 1989

[51] Int. Cl.$^4$ ................................................ A01D 75/00
[52] U.S. Cl. .................................... 56/320.2; 56/17.4
[58] Field of Search ................ 56/17.4, 320.1, 320.2, 56/255

[56] References Cited

U.S. PATENT DOCUMENTS

| | | | |
|---|---|---|---|
| 2,559,897 | 7/1951 | Phelps | 56/17.4 X |
| 2,982,079 | 5/1961 | Schesser | 56/17.4 |
| 3,043,077 | 7/1962 | Novak | 56/320.2 X |
| 3,101,580 | 8/1963 | Schesser | 56/17.4 |
| 3,126,689 | 3/1964 | Walker et al. | 56/320.1 |
| 3,385,041 | 5/1968 | Douglas | 56/255 |
| 3,391,524 | 7/1968 | Nickoloff et al. | 56/320.2 |
| 4,189,904 | 2/1980 | Paker | 56/320.2 X |
| 4,306,409 | 12/1981 | Wulfers | 56/320.2 |
| 4,411,125 | 10/1983 | Strickland | 56/320.1 X |

*Primary Examiner*—George A. Suchfield

[57] ABSTRACT

A lawn mower attachment that allows the lawn mower to pulverize the lawn clippings into a mulch. The mulching attachment mounts over the opening to the discharge chute (90). It consists of equally spaced rods (30) that form a grid. This grid permits air to escape while filtering the mulched material. Each rod (30) is suspended such that it is free to rotate about its longitudinal axis, move vertically in response to the terrain, and pivot about the suspended end. The pivot motion is constrained in angular displacement so as not to decrease the mulching capability. The vertical, rotating, and pivoting motion of the rods act to cleanse the grid and return the residue for further trituration. Limiting the grid rod motion insures grid integrity thus insuring that only properly prepared residue escapes.

4 Claims, 4 Drawing Sheets

LEAF AND GRASS MULCHING ATTACHMENT FOR LAWN MOWERS

BACKGROUND--FIELD OF INVENTION

This invention pertains to lawn care and specifically is an attachment to a lawn mower to enhance the pulverizing action of the mower and provide for uniform distribution of leaf and grass residue over the lawn.

BACKGROUND--DISCUSSION OF PRIOR ART

Heretofore, leaf and grass mulching attachments for lawn mowers of the horizontal rotating blade construction have employed various techniques to enhance the pulverizing effect of the blade. In particular the simplest of these incorporates a method of blocking the discharge opening and constraining the residue in the housing plenum to permit the blade to have a longer time to triturate the residue. The material is then forced to exit the mower housing through ventilation holes in the attachment thus approximating uniform distribution. A variety of methods have been used to cover the discharge opening and each displays certain operational deficiencies. The leaf mulcher attachment in patent 4,189,904 to Paker, 1980 Feb. 26, has no means to prevent the openings from becoming plugged when heavy concentrations of residue are held against the vent holes by a pressure differential. It is important that ventilation passages be open and of sufficient size to allow the mower to continue to operate effectively. Without sufficient air flow the quality of the mowing decreases and large clumps of residue are squeezed out from the periphery of the mower housing. This has become an increasingly important issue since more and more powers are incorporating blades that are shaped to produce high air volumes. This extra air is intended to improve the mowing quality by forcing the grass blades vertical permitting the mower blade to cut the grass. The mulching grid in patent 4,306,409 to Wulfers, 1981 Dec 22, provides for ventilation with cleansing capability but the unconstrained motion of the flexible chain does not control the size of the ventilation openings thus allowing uneven discharges to occur. In addition the chains must be suspended in the discharge chute a sufficient distance from the blade in order to prevent blade and chain contact. If the chains are installed away from the immediate opening any residue being contained by the barrier of chains will not likely be recirculated by the blade and further pulverized.

OBJECTS AND ADVANTAGES

Accordingly several objects and advantages of my invention are: to provide a low cost leaf and grass mulching attachment to a lawn mower to filter the leaf and grass residue escaping through the discharge chute, to provide a mulching attachment that limits the extremes of the ventilation openings to more carefully filter the discharge and to provide a mulching attachment that has means to continually cleanse the grid while retaining control over the filter spacing.

In addition I claim the following additional objects and advantages: to provide a low cost leaf and grass mulching device that can be easily attached to a lawn mower with a horizontally rotating blade, and to provide a mulching attachment that may be safely mounted at the preferred location of the mower housing discharge opening while insuring that none of the mulching attachment parts can contact the moving blade at the extreme positions.

Readers will find further objects and advantages of the invention from a consideration of the ensuing description and the accompanying drawings.

DRAWING FIGURES

Figure 1:
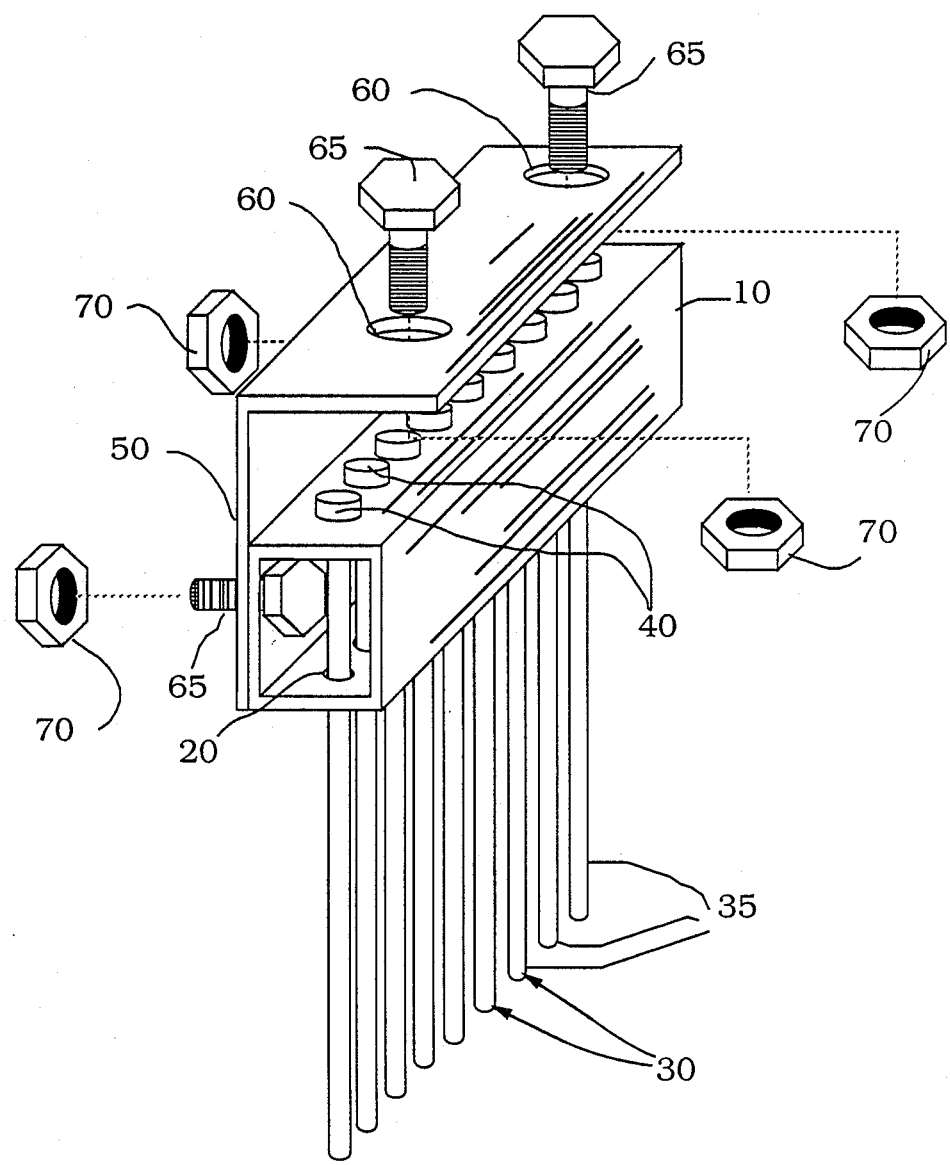
FIG. 1 shows a perspective front elevational view of a mulching attachment according to the invention.

DRAWING REFERENCE NUMERALS:

10 grid rod holder
15 upper grid rod holes in 10
20 lower grid rod holes in 10
25 mounting holes in 10
30 grid rod
35 grid rod shank
40 grid rod head
50 mounting bracket
55 grid rod holder mounting holes in 50
60 mounting holes in 50
65 bolt for 50
70 nut for 65
80 mower deck
90 discharge chute for 80

LEAF AND GRASS MULCHING ATTACHMENT DESCRIPTION

FIG. 1 shows the mulching attachment in the preferred embodiment of the invention. The mulcher comprises a number of grid rods 30, a grid rod holder 10, a mounting bracket 50, and assembly hardware.

Figure 4:
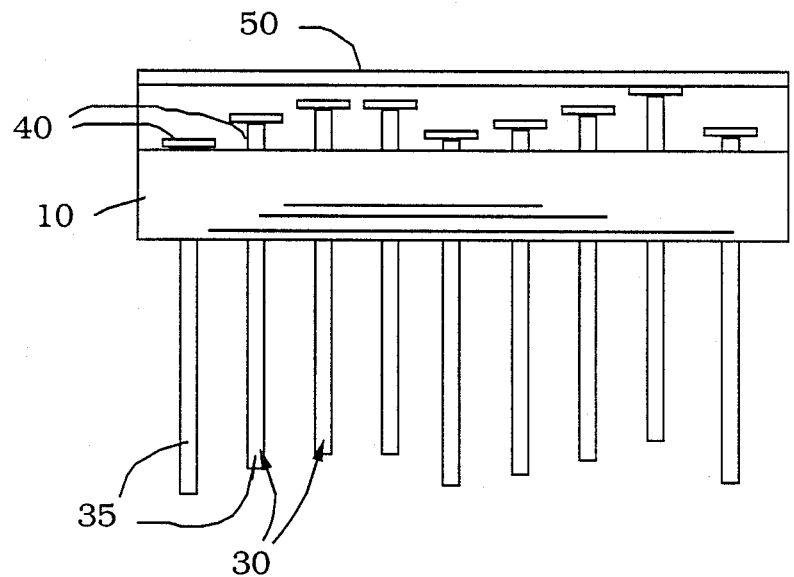
FIG. 4 shows a front view of the mulching attachment.

The grid rods 30 are comprised of two portions: the grid rod shank 35 and the grid rod head 40 as shown in FIG. 1 and FIG. 4.

Figure 2:
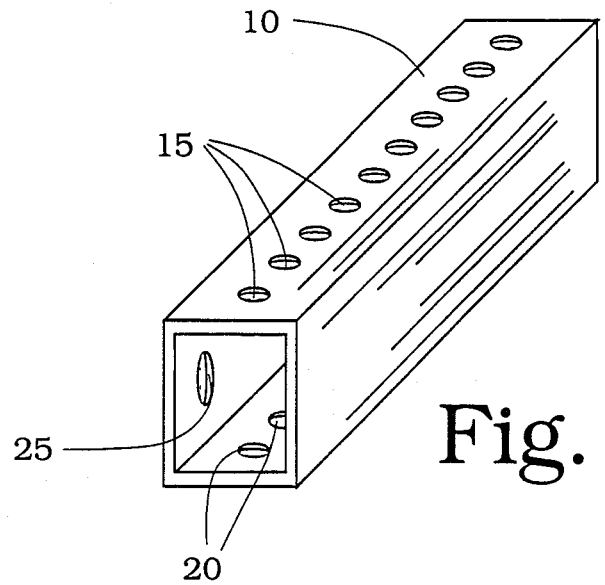
FIG. 2 shows a perspective front elevational view of the grid rod holder.
Figure 7:
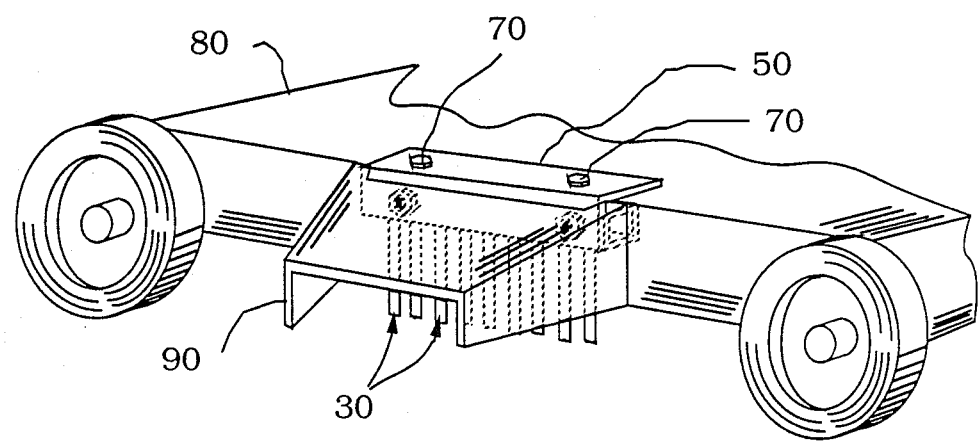
FIG. 7 shows the mulching attachment mounted at the preferred location on a lawn mower.

The grid rod holder 10 is preferably made of rectangular tubing of a length that is equivalent to the width of the discharge opening in the mower deck 80 as shown in FIG. 7. FIG. 2 shows the grid rod holder 10 in the preferred embodiment. The grid rod holder 10 is perforated, along the lengthwise dimension, with the upper grid rod holes 15 in the top surface and the lower grid rod holes 20 in the bottom surface. The holes 15 and 20 are spaced at specified intervals to provide a selected degree of filtering. They are of a size and shape to accept the grid rod shanks 35 but the upper grid rod holes 15 are smaller than the rod heads 40, thus the movement of the grid rods in the longitudinal direction is limited.

Figure 3:
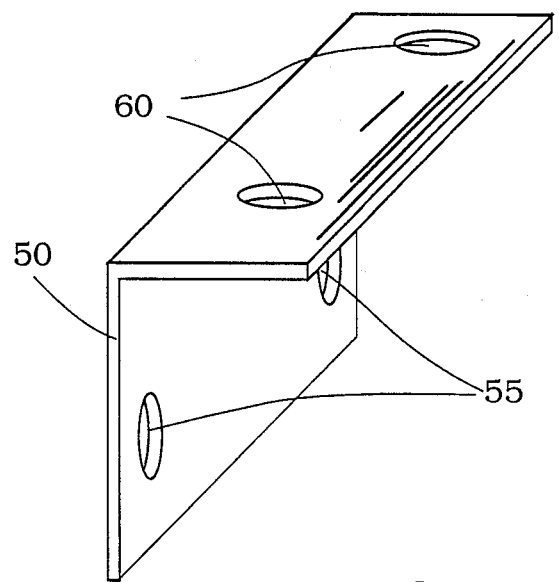
FIG. 3 shows a perspective front elevational view of the mounting bracket.

The mounting bracket 50 has a right angle profile with two holes on each face to accommodate attachment to the mower deck 80 and to the grid rod holder 10 as shown in FIG. 3.

FIG. 1 shows the assembly with the grid rod shanks 35 inserted into the the upper grid rod holes 15 and the lower grid rod holes 20 in the grid rod holder 10 and suspended in the vertical plane from the grid rod heads 40. The grid rod holder 10 is connected to the mounting bracket 50 by bolts 65, nuts 70, and mounting holes 55.

Figure 5:
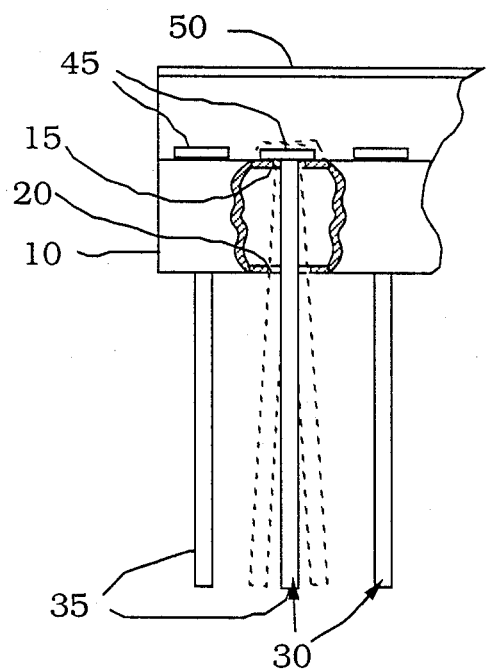
FIG. 5 shows a cut away view of the grid rod holder showing the degree of freedom of the grid rod.
Figure 6:
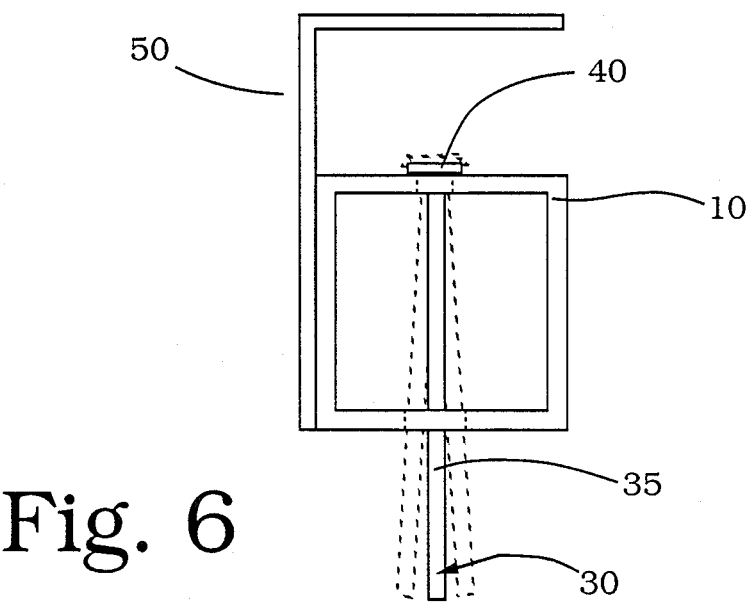
FIG. 6 is a side view of the mulching attachment the degree of freedom of the grid rod.

FIG. 4 shows the longitudinal degree of freedom of the grid rods 30. FIG. 5 and FIG. 6 show the constrained pivot degree of freedom the grid rods have due to the difference in size of the cross section of the grid rod shanks 35 and the upper and lower grid rod holes, 15 and 20.

FIG. 7 shows the mounting bracket 50 connected to the mower deck 80 using bolts 65, nuts 70 and holes 60. The mulching attachment is mounted inside the discharge chute 90 with the grid rods 30 suspended in the vertical plane and located so as to cover the discharge opening.

LEAF AND GRASS MULCHING ATTACHMENT OPERATION

With the mulching attachment mounted on the mower deck 80 and the mower operating, the mulching attachment is positioned to assist the mower in generating mulch. The grass clippings and triturated leaf residue produced by the rotating mower blade escape the mower housing via the air currents generated by the rotating blade. Air is drawn into the housing from around the periphery and expelled through the discharge opening and the discharge chute 90. The residue is impeded from escaping through the discharge opening by the filtering action of the mulching attachment. The grid rods 30 are of sufficient number to span the entire width with a selected spacing and are of a necessary length to reach near the nape of the turf. The distance between the grid rods 30 specifies the degree of filtering. The spacing is selected to optimize the quality of the mulching action. Appropriate spacing permits sufficient air flow to be maintained and properly triturated residue to escape while restraining clippings that are too large. The motion of the mower and the force due to the resistance of the grass causes the rods to agitate. The grid rods 30 are permitted to rotate about their longitudinal axis and a constrained angular motion is permitted as shown in FIG. 5 and FIG. 6 with the upper grid rod hole being the approximate point of rotation. This motion is permitted by the difference in cross sectional size and shape of the larger lower grid rod hole 20 and the grid rod shank 35. The upper grid rod hole 15 must also be larger than the grid rod shank 35 in order to permit the angular motion of the grid rod 30. This motion only varies the spacing slightly but acts to prevent clogging of the mulching attachment while permitting the properly triturated material to escape. The very small lateral motion permitted by the size difference between the holes and the grid rod shank 35 is inconsequential to the performance or integrity of the grid. Longitudinal motion of the grid rods 30 is also permitted. The grid rod head 40 suspends the grid rod 30 from the grid rod holder 10 and defines the static shape of the grid. When the mower is in operation there is vertical motion of the mower deck 80 and subsequently to the mulching attachment due to variation in the terrain. As shown in FIG. 4, the mulching attachment is permitted to adjust to this vertical displacement by allowng the grid rods 30 to move up and down through the upper grid holes 15 and the lower grid rod holes 20. Maximum upper travel is limited by contact of the grid rods 30 with the mounting bracket 50 and the maximum downward motion is limited by the grid rod head 40 contacting the grid rod holder 10. The vertical, rotating, and angular motion of the grid rods all act to cleanse the grid and return the insufficiently prepared residue back into the air flow for further trituration.

While the above description contains many specificities, the reader should not construe these as limitations on the scope of the invention, but merely as exemplifications of preferred embodiments thereof. Those skilled in the art will envision many other possible variations and are within its scope. For example, the grid rod holder 10 and the mounting bracket 50 could be fabricated or molded from a variety of materials and in a varying number of pieces and shapes. The shape of the grid rods 30, both the cross sectional and the lengthwise profile, could be altered without changing the function. Also the means of constraining the motion of the grid rods could be varied. As shown in FIG. 2, the upper grid rod holes 15 and the lower grid rod holes 20 are used to both suspend the grid rods 30 and limit the lateral and angular motion of the grid rods 30. Though FIG. 1 and FIG. 2 suggest that the upper grid rod holes 15 and the lower grid rod holes 20 be circular, various shapes could be used to control the motion in various directions. It is also not necessary that the grid rod shank 35 have a circular cross section. Varying the shape of the grid rod shank cross section could also be used to limit the grid rod 30 motion and thus control the filtering action of the grid. A single row of grid rod holes could also be used by using material of sufficient thickness so as to obtain the necessary constraint on the angular motion. Accordingly the reader is requested to determine the scope of the invention by the appended claims and their legal equivalents, and not by the examples which have been given.

I claim:

1. A leaf and grass mulching attachment for lawn mowers connected to a lawn mower comprised of a housing that shrouds a cutting blade rotating in the horizontal plane having a discharge opening in the vertical plane which is covered by said mulching attachment comprising:
   (a) a mounting bracket for connecting the mulching attachment to said lawn mower,
   (b) a grid rod holder that is attached to said mounting bracket and is of a length that spans the width of said discharge opening and perforated with a single row of holes of selected spacing along the length of said grid rod holder, and
   (c) a series of grid rods of a length to span the vertical dimension of the discharge opening and a lateral dimension and shape to fit in the said holes of the grid rod holder and with one end of said longitudinal rod of sufficient size to provide a means of preventing the rod from fitting through the holes in the grid rod holder wherein said grid rods are inserted into each hole of the grid rod holder and the mounting bracket with the grid rod holder attached is fixed to the housing of the lawn mower such that the rods are oriented vertically with respect to the grid rod holder thereby forming a filter grid over the discharge opening.

2. The mulching attachment of claim 1 wherein a difference in cross sectioal dimension of the grid rods and the size of the grid rod holes in the grid rod holder provide a means to permit the grid rod a lateral and angular motion constrained by the magnitude of the said difference.

3. The mulching attachment of claim 2 wherein the grid rods are free to rotate about their longitudinal dimension.

4. The mulching attachment of claim 2 wherein the grid rods are free to move in the longitudinal direction and constrained by the grid rod holder and the mounting bracket to inhibit the maximum distance of travel.

* * * * *